(12) United States Patent
Garcia-Martinez et al.

(10) Patent No.: US 10,248,975 B2
(45) Date of Patent: Apr. 2, 2019

(54) PROVIDING ADVERTISEMENT CONTENT VIA AN ADVERTISEMENT PROXY SERVER

(71) Applicant: Facebook, Inc., Menlo Park, CA (US)

(72) Inventors: Antonio Felipe Garcia-Martinez, Alameda, CA (US); Gang Wu, San Jose, CA (US); Shreehari Manikarnika, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 232 days.

(21) Appl. No.: 13/778,392

(22) Filed: Feb. 27, 2013

(65) Prior Publication Data

US 2014/0244406 A1 Aug. 28, 2014

(51) Int. Cl.
*G06Q 30/02* (2012.01)
(52) U.S. Cl.
CPC ................. *G06Q 30/0277* (2013.01)
(58) Field of Classification Search
USPC ......... 705/14.64, 14.66, 14.73, 14.58, 14.49, 705/14.52, 14.53, 14.61, 14.41, 14.45, 705/14.46, 14.69, 14.71, 35, 39, 14.5; 707/E17.044, 999.009, 999.01, E17.014, 707/E17.116, 999.003, 999.005, 999.104; 709/202, 217, 224; 715/864; 725/54, 93
See application file for complete search history.

(56) References Cited

U.S. PATENT DOCUMENTS

| | | | |
|---|---|---|---|
| 6,487,538 B1 | 11/2002 | Gupta et al. | |
| 9,009,834 B1* | 4/2015 | Ren | G06F 21/10 709/224 |
| 2004/0075686 A1 | 4/2004 | Watler et al. | |
| 2006/0031404 A1 | 2/2006 | Kassab | |
| 2007/0239528 A1* | 10/2007 | Xie | G06Q 30/02 705/14.55 |
| 2007/0288247 A1* | 12/2007 | Mackay | G06Q 10/00 705/1.1 |
| 2008/0103903 A1* | 5/2008 | Flake et al. | 705/14 |

(Continued)

FOREIGN PATENT DOCUMENTS

WO WO 2012/162479 A2 11/2012

OTHER PUBLICATIONS

European Patent Office, Search Report and Opinion, EP Patent Application No. 14156477.3, dated May 9, 2014, six pages.

(Continued)

*Primary Examiner* — Patricia H Munson
(74) *Attorney, Agent, or Firm* — Fenwick & West LLP (57) ABSTRACT

An advertisement (ad) proxy server acts as a proxy for serving content of third-party ads to users of an online system, reducing data leakage from users to advertisers. The ad proxy server acts as an intermediate storage and access point for content included in advertisement, such as images and videos. When an advertisement from an advertiser is selected for presentation by the online system, an ad tag identifying the location of the content for the selected ad is retrieved and used to retrieve a copy of the advertisement content. The ad proxy server stores the copy of the advertisement content and generates a modified ad tag identifying the ad proxy server. The modified ad tag is sent to a client device, which retrieves the copy of the advertisement content from the ad proxy server rather than directly from the advertiser.

12 Claims, 5 Drawing Sheets

(56) References Cited

U.S. PATENT DOCUMENTS

| | | | |
|---|---|---|---|
| 2009/0276314 A1* | 11/2009 | Gorodyansky et al. ... | 705/14.53 |
| 2010/0049605 A1* | 2/2010 | Kim et al. ............... | 705/14.52 |
| 2010/0324999 A1* | 12/2010 | Conway et al. .......... | 705/14.73 |
| 2011/0016197 A1 | 1/2011 | Shiimori et al. | |
| 2011/0246298 A1* | 10/2011 | Williams et al. ......... | 705/14.53 |
| 2012/0116896 A1* | 5/2012 | Holloway et al. ........ | 705/14.73 |
| 2012/0124161 A1 | 5/2012 | Tidwell et al. | |

OTHER PUBLICATIONS

PCT International Search Report and Written Opinion, PCT Application No. PCT/US2014/018048, dated May 27, 2014, thirteen pages.

* cited by examiner

PROVIDING ADVERTISEMENT CONTENT VIA AN ADVERTISEMENT PROXY SERVER

BACKGROUND

This invention relates generally to advertising, and in particular to storing and serving advertising impressions to web browsers accessing online systems.

Advertisers pay various online systems to present their advertisements ("ads") to users of the online systems. For example, users access online systems having websites including space allocated for advertisements through web browsers, and advertisers may provide bids to an online for displaying ads associated with the advertisers. Advertisers often seek to present ads to users likely to be interested in their products or services and most likely to purchase the advertised products or services. Accordingly, if a particular user is likely to purchase an advertised product or service, an advertiser may increase the amount bid to the online system to increase the likelihood of an advertisement from the advertiser being presented to the user.

To identify users likely to interact with an ad or likely to purchase advertised products or services, advertisers and their partners often track, store, and analyze users' online activity. A user's online activity informs advertisers of the preferences and behaviors of that user. Various techniques may be used to obtain a user's online activity. For example, cookies stored and on the user's computer, web bugs such as tracking pixels and JAVASCRIPT® tags, and locally shared objects.

Online system users are typically unaware of advertiser tracking, so these users are often unaware of the information provided to advertisers. For example, online activity tracking frequently begins when a user visits a web site, with no explicit request for permission to track. Further, sophistication online activity tracking has become more sophisticated, allowing advertisers to learn more and more about users. This increase in tracking sophistication, coupled with users' lack of knowledge about tracking, increases privacy concerns.

SUMMARY

An advertisement (ad) proxy server of an online system acts as a proxy for serving content in third-party ads to users of the online system, reducing data leakage from users to third-parties providing advertisements via the online system. This increases the protection of online system users' personal information from ad servers of the third party system. The ad proxy server acts as an intermediate storage and access point for content included in advertisement, such as images and videos. When an advertisement from a third-party advertiser is selected by the online system to present an advertisement, the online system obtains an ad tag of the selected ad (e.g., a uniform resource locator or other network address of an ad). The ad tag identifies the networking address from which the selected advertisement is retrieved. For example, the online system receives an ad tag identifying an ad selected by an auction performed by the online system from an ad server of the third-party advertiser.

The online system communicates the ad tag of the selected advertisement to an ad proxy server associated with the online system. The ad proxy server retrieves a copy of the advertisement using the network address specified by the ad tag. Generally, the network address specified by the ad tag identifies an ad server or affiliated content delivery network (CDN) from which the ad is retrieved. The copy of the ad is stored by the ad proxy server, which also generates a modified ad tag uniquely affiliated with the ad tag. The modified ad tag specifies a network address associated with the ad proxy server from which the selected advertisement is retrieved. The network address of the modified ad tag identifies a domain associated with the ad proxy server (e.g., the ad proxy server itself or a CDN associated with the ad proxy server) rather than identify a domain associated with the ad server. The modified ad tag may include information identifying the ad tag from the third-party advertiser. For example, the modified ad tag includes a hash of the ad tag from the third-party advertiser.

The online system includes the modified ad tag in content resented to a client device. The content includes the selected advertisement, so when a browser executing on the client device renders the content, the browser retrieves content for the advertisement from the copy of the advertisement maintained by the ad proxy server and identified by network address of the modified ad tag. Because the modified ad tag includes a network address associated with the online system, the advertisement is presented via the online system rather than via the third-party advertiser. This prevents the third-party advertiser from sending an ad tag that may include a tracking mechanism to the client device.

The features and advantages described in this summary and the following detailed description are not all-inclusive. Many additional features and advantages will be apparent to one of ordinary skill in the art in view of the drawings, specification, and claims.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Architecture

Figure 1:
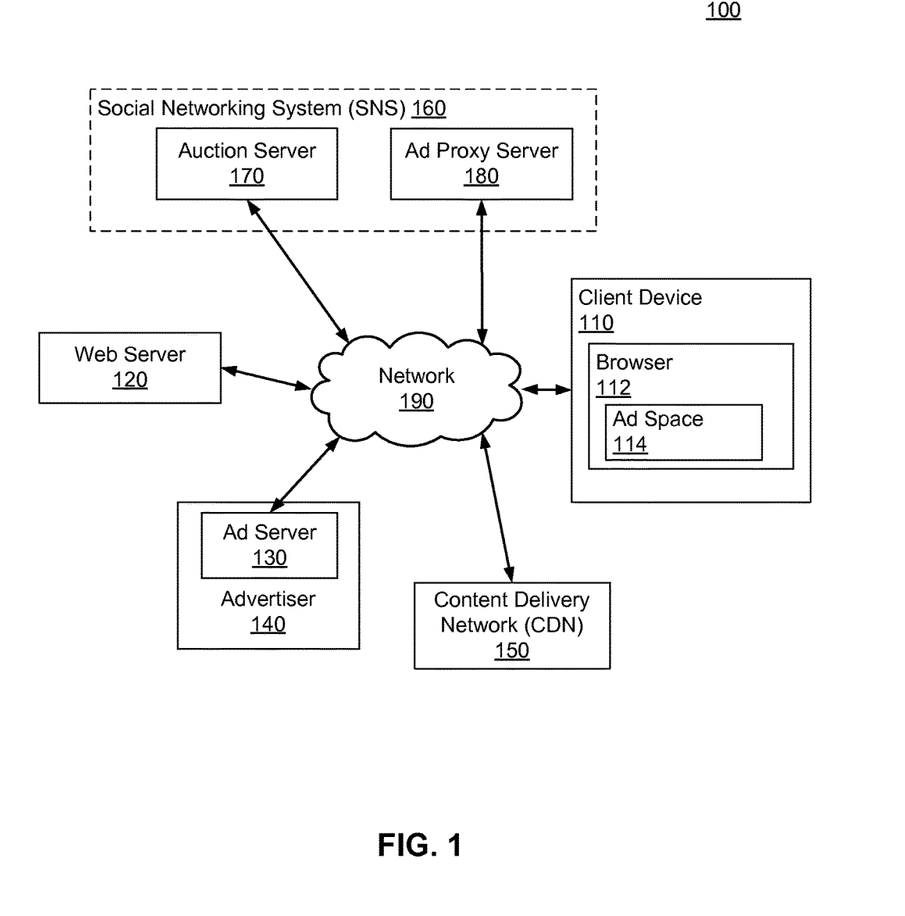
FIG. 1 is a block diagram of a one embodiment of a system environment 100, according to one embodiment.

FIG. 1 is a block diagram of a one embodiment of a system environment 100. In the example of FIG. 1, the system environment 100 includes a client device 110, a web server 120, an ad server 130, an advertiser 140, a content delivery network (CDN) 150, an auction server (or ad exchange) 170, an ad proxy server 180, and a network 190. In some instances, the auction server 170 and ad proxy server 180 are components of an online system, such as a social networking system 160.

The network 190 is a communication pathway, such as a local area network (LAN), a metropolitan area network (MAN), a wide area network (WAN), a mobile wired or wireless network, a private network, a virtual private network, or any combination of the preceding. For example, the network 190 is the Internet. In one embodiment, the network 190 uses standard communications technologies and/or protocols. Examples of protocols used on the network 190 include the transmission control protocol/Internet protocol (TCP/IP), the hypertext transport protocol (HTTP), the file transfer protocol (FTP), etc. Data exchanged over the network 190 may be represented using technologies and/or formats including the hypertext markup language (HTML), the extensible markup language (XML), or any suitable format. In some embodiments, information may be communicated via the network using custom and/or dedicated data communications technologies instead of, or in addition to, the ones described above.

The client device 110 allows users to transmit and/or receive content via the network 190. For example, a user uses a client device 110 to retrieve content from web servers 120 through network 190. The client device 110 may be a desktop computer, laptop computer, portable computer, personal digital assistant (PDA), smart phone, or any other device including computing functionality and data communication capabilities. In the embodiment shown by FIG. 1, the client device 110 executes a web browser, which executes instructions included in content from a web server 120, or from another source, describing content and presentation of the content from a web server 120 to a client device user. Hence, the web browser 112 and the client device 110 allow a user to access, view, and interact with content provided by a web server 120.

A web server 120 maintains content and communicates the content to client devices 110 or to any other entity (e.g., to the social networking system 160) via the network 190. Content provided or managed by the web server 120 may also include one or more advertisement ("ad") spaces 114, where advertisements are included with the content. For example, the web server 120 provides a web page including content from the web server 120 and also including one or more ad spaces 114. Typically, information included in an ad space 114 is not provided by the web server 120, but is retrieved from an ad server 130 associated with an advertiser 140. In some embodiments, an advertiser 140 compensates the web server 120 for presenting advertisements associated with the advertiser 140 in ad space 114.

Content for presentation in the ad space 114 is generally not sent to the client device 110 from the web server 120, but includes code and/or a network address for retrieving content presented in the ad space 114. In one embodiment, the code or network address communicates with an auction server 170, which selects an advertisement ("ad") for presentation in the ad space 114. When the auction server 170 selects an ad for presentation, the auction server 170 provides the client device 110 with an ad tag associated with the selected ad. The ad tag is a network identifier or other information identifying the source of content for the selected ad to be presented in the ad space 114.

To select an ad for presentation via the ad space 114, the auction server 170 receives bids from various advertisers 140 specifying compensation from an advertiser 140 to the web server 120 or to the auction server 170 for presenting an ad associated with the advertiser 140. For example, the auction server 170 sends a request for bids to one or more advertisers. In one embodiment, the request for bids includes user characteristics from the auction server 170 describing the user of the client device 110 to be presented with the advertisement. For example, the user characteristics provides information identifying or classifying the user, the client device 110, and/or the web browser 112 to be presented with the advertisement. Inclusion of user characteristics in a request for bids is further described below with respect to FIG. 2. Based the request for bids, advertisers 140 send one or more ad requests and/or bids to the auction server 170 specifying compensation for presentation of the advertisement in the ad space 114. Bids may include targeting criteria specified by an advertiser 140 to identify characteristics of users to be presented with an advertisement associated with the advertiser 140. Ad requests and targeting criteria are further described below in conjunction with FIG. 3.

Based on ad requests received from one or more advertisers 140 or bids received from the one or more advertisers 140 for previously provided bid requests, the auction server 170 selects an ad request based at least in part on the amounts of the received bids. In one embodiment, if the received bids associated with ad requests are cost per impression prices, the ad request having the highest bid amount is selected. Alternatively, if the bid amounts of the ad requests are cost per click prices, the auction server 170 determines an expected value for each ad request and selects an ad request based on the expected values. For example, the expected value of an ad request is a function of a per-click bid amount weighted by an estimated probability that the ad specified by the ad request will be accessed by the user.

The content delivery network (CDN) 150 is a distributed system of servers included in multiple data centers at different locations that provides content to client devices 110 via the network. One or more content providers may be associated with a CDN 150 to communicate content to users of client devices 110. Using data centers at different locations allows the CDN 150 to more quickly retrieve and present content to client devices 110 in different locations. For example, the CDN 150 is associated with the advertiser 140, so the CDN 150 maintains advertisement content for the advertiser 140 and communicates the advertisement content to client devices 110 via the network 190. A CDN 150 may also be associated with the ad proxy server 180 and used to provide content from the ad proxy server 180 to client devices 110.

When selecting an ad request, the auction server 170 may account for user characteristics specified in the request for bids and targeting criteria specified in the ad requests. In one embodiment, ad requests associated with one or more targeting criteria satisfied by user characteristics of the user to be presented with the advertisement are selected and ranked by the auction server 170. For example, the auction server 170 uses the user characteristics to specify types of users most likely to interact with advertisements associated with different targeting criteria. This allows the auction server 170 to increase the likelihood of users interacting with advertisements presented using the ad space 114. This increase in user interaction with presented advertisements may increase the value of the ad space 114 to the web server 120, increasing revenue provided to the web server 120 from the ad space 114.

The auction server 170 may use various methods to select the advertisement for presentation. In one embodiment, ad requests are ranked based on a combination of their bids and an extent to which the user characteristics of the user to be presented with the advertisement matches the targeting criteria of the ad requests. In various embodiments, bid amounts and targeting criteria satisfied by user criteria may be weighted and used to generate a ranking of ad requests. The highest ranked ad request in the ranking is selected to be presented.

The auction server 170 identifies the selected ad request to the advertiser 140 associated with the selected ad request and to the web server 120. The notification may identify to the advertiser 140 the amount owed to the auction server 170 and to the web server 120. In one embodiment, server-to-server notification is used to protect characteristics of the user to be presented with the advertisement. No information describing the user, the web browser 112, or the client device 110 receiving the ad is provided to the advertiser 140 or to the web server 120. Limiting information provided to advertisers 140 to information relevant to the winning ad request prevents the recipients of the notification (e.g., the ad server 130) from obtaining information about the user, protecting the user's privacy.

The auction server 170 identifies an ad tag associated with the selected advertisement that specifies a network address or other identifier of a location from which content comprising the advertisement is retrieved. For example, the ad tag identifies a network address of the ad server 130 from which the advertisement is provided. While the ad tag may be provided to the client device 110, allowing the client device to retrieve the content of the selected ad, if the selected ad includes a user tracking mechanism, information describing the user may be communicated from the client device 110 to the advertiser when the ad content is viewed.

For example, if the ad tag provides a network address affiliated with the ad server 130, when the client device 110 accesses the ad through the web browser 112, the ad server 130 may identify and track interactions with the browser 112 or with the client device 110. Examples of tracking mechanisms included in an advertisement include inserting a cookie, a tracking pixel, or other computer code in or along with the selected ad. The ad server 130 may correlate information from the web browser 112 and/or the client device 110 with user characteristics received from the request for bids to collect information about the user.

To prevent this leakage of user information, the ad tag of the selected ad is communicated from the auction server 170 to the ad proxy server 180, rather than to the client device 110. As further described in conjunction with FIG. 4, the ad proxy server 180 retrieves a copy of the selected ad using the network address specified by the ad tag. The copy of the ad is stored by the ad proxy server 180, which also generates a modified ad tag specifying a network address associated with the ad proxy server 180 from which the selected ad retrieved. The modified ad tag is communicated to the client device 110, so the browser 114 retrieves content for the selected ad from the ad proxy server 180. This prevents and advertiser 140 from capturing information about a user presented with the selected ad.

Example Online System Architecture

Figure 2:
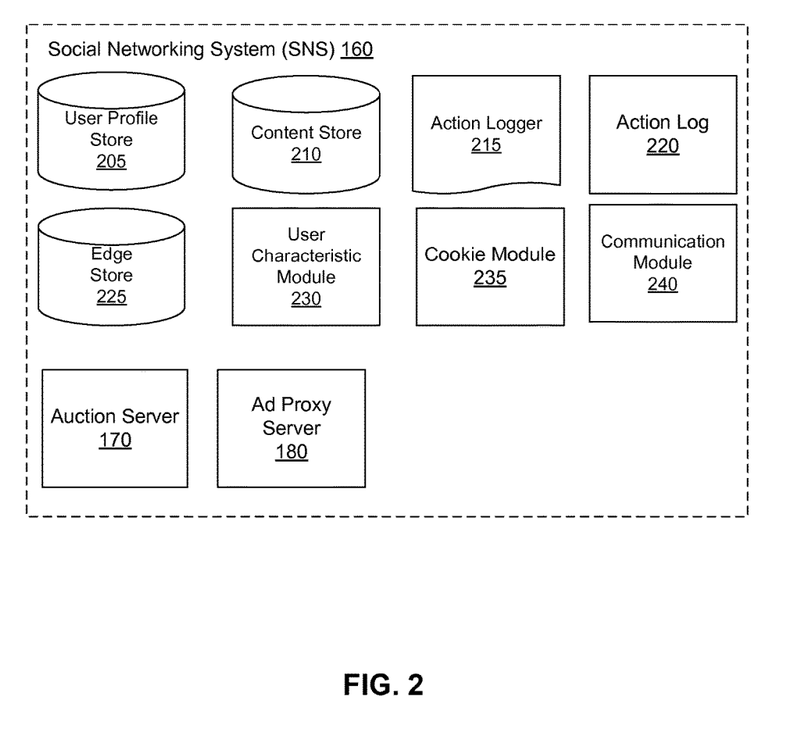
FIG. 2 is a block diagram of a social networking system, according to one embodiment.

FIG. 2 is a block diagram of one embodiment of a social networking system 160. Information about users of the social networking system 160 may be retrieved, subject to user-specified privacy settings, and communicated to the auction server 170. These user characteristics may be compared to targeting criteria associated with ad requests to identify users eligible to be presented with advertisements associated with the ad requests. In one implementation, the social networking system 160 includes a user profile store 205, a content store 210, an action logger 215, an action log 220, an edge store 225, a user characteristics module 230, and a cookie module 235. The social networking system 160 may also include the auction server 170 and the ad proxy server 180. While FIGS. 1 and 2 describe a social networking system 160, in other embodiments any suitable online system maintaining information describing characteristics of its user may be used.

Each user of the social networking system 160 is associated with a user profile, which is stored in the user profile store 205. A user profile includes declarative information about the user that was explicitly shared by the user and may also include profile information inferred by the social networking system 160. In one embodiment, a user profile includes multiple data fields, each describing one or more attributes of the corresponding user of the social networking system 160. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with identification information of users of the social networking system 160 displayed in an image. A user profile in the user profile store 205 may also maintain references to actions by the corresponding user performed on content items in the content store 210 and stored in the action log 220.

The content store 210 stores objects that each represent various types of content. Examples of content represented by an object include a page post, a status update, a photograph, a video, a link, a shared content item, a gaming application achievement, a check-in event at a local business, a brand page, or any other type of content. Social networking system users may create objects stored by the content store 210, such as status updates, photos tagged by users to be associated with other objects in the social networking system, events, groups or applications. In some embodiments, objects are received from third-party applications or third-party applications separate from the social networking system 160. In one embodiment, objects in the content store 210 represent single pieces of content, or content "items." Hence, users of the social networking system 160 are encouraged to communicate with each other by posting text and content items of various types of media through various communication channels. This increases the amount of interaction of users with each other and increases the frequency with which users interact within the social networking system 160.

The action logger 215 receives communications about user actions internal to and/or external to the social networking system 160, populating the action log 220 with information about user actions. Examples of actions include adding a connection to another user, sending a message to another user, uploading an image, reading a message from another user, viewing content associated with another user, attending an event posted by another user, among others. In addition, a number of actions may involve an object and one or more particular users, so these actions are associated with those users as well and stored in the action log 220.

The action log 220 may be used by the social networking system 160 to track user actions on the social networking system 160, as well as actions on third party systems that communicate information to the social networking system 160. Users may interact with various objects on the social networking system 160, and information describing these interactions are stored in the action log 220. Examples of interactions with objects include: commenting on posts, sharing links, and checking-in to physical locations via a mobile device, accessing content items, and any other interactions. Additional examples of interactions with objects on the social networking system 160 that are included in the action log 220 include: commenting on a photo album, communicating with a user, establishing a connection with an object, joining an event to a calendar, joining a group, creating an event, authorizing an application, using an application, expressing a preference for an object ("liking" the object) and engaging in a transaction. Additionally, the action log 220 may record a user's interactions with advertisements on the social networking system 160 as well as with other applications operating on the social networking system 160. In some embodiments, data from the action log 220 is used to infer interests or preferences of a user, augmenting the interests included in the user's user profile and allowing a more complete understanding of user preferences.

The action log 220 may also store user actions taken on a third party system, such as an external website, and communicated to the social networking system 160. For example, an e-commerce website that primarily sells sporting equipment at bargain prices may recognize a user of a social networking system 160 through a social plug-in enabling the e-commerce website to identify the user of the social networking system 160. Because users of the social networking system 160 are uniquely identifiable, e-commerce websites, such as this sporting equipment retailer, may communicate information about a user's actions outside of the social networking system 160 to the social networking system 160 for association with the user. Hence, the action log 220 may record information about actions users perform on a third party system, including webpage viewing histories, advertisements that were engaged, purchases made, and other patterns from shopping and buying.

In one embodiment, an edge store 225 stores information describing connections between users and other objects on the social networking system 160 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 160, such as expressing interest in a page on the social networking system, sharing a link with other users of the social networking system, and commenting on posts made by other users of the social networking system.

In one embodiment, an edge may include various features each representing characteristics of interactions between users, interactions between users and object, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the social networking system 160, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the social networking system 160 over time to approximate a user's affinity for an object, interest, and other users in the social networking system 160 based on the actions performed by the user. A user's affinity may be computed by the social networking system 160 over time to approximate a user's affinity for an object, interest, and other users in the social networking system 160 based on the actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The user characteristics module 230 retrieves information from one or more of the user profile store 205, the action log 220, and the edge store 225 to determine user characteristics for one or more social networking system users. The user characteristics may be communicated to the auction module 170 for comparison to targeting criteria associated with ad requests. In one embodiment, the user characteristics module 230 associates information retrieved from the user profile store 205, the action log 220, and/or the edge store 225 with a user identifier.

As described above in conjunction with FIG. 1, the auction server 170 selects an ad for presentation to a user in an ad space 114 from received ad requests. The auction server 170 is configured to determine the user identifier of a user to be presented with an advertisement in the ad space 114 and may retrieve user characteristics associated with the user identifier from the user characteristics module 230. Based on the retrieved user characteristics, the auction module 170 may identify ad requests having one or more targeting criteria satisfied by the user characteristics and selects an ad request from the identified ad requests. In some embodiments, retrieval of user characteristics from the user characteristic module 230 is limited to when the user is logged into the social networking system 160 when the content including the ad space 114 is being accessed or is logged into the social networking system 160 within a threshold length of time of when the content is accessed.

When the user accessing content including the ad space 114 is not is not logged into the social networking system 160, user characteristics are not retrieved from the user characteristic module 230. To identify the user when the user is not logged in, the social networking system 160 may include a cookie module 235. When a user logs in to its account with the social networking system 160, the cookie module 235 communicates one or more cookies to the client device 110, which are stored on the client device 110. The cookies correlate the user of the social networking system 160 with the web browser 112 used by the client device 110. For example, a cookie includes a user identifier associated with the user by the social networking system 160 and an additional cookie includes a browser identifier identifying the web browser 112. The cookies are stored until deleted by the user or by the web browser 112. Users may associate one or more privacy settings with their user profiles stored by the social networking system 160 to prevent receipt of cookies from the social networking system 160. If a user is not logged into the social networking system 160 when accessing the content including the ad space 115, the social networking system 160 may access one or more of the stored cookies to identify the user and retrieve user characteristics associated with the user.

The communication module 240 links the social networking system 160 via the network 190 to the one or more client devices 110, as well as to one or more third party systems. The communication module 240 serves web pages, as well as other web-related content, such as JAVA®, FLASH®, XML and so forth. The communication module 240 may receive and route messages between the social networking system 160 and the client device 110, for example, instant messages, queued messages (e.g., email), text messages, short message service (SMS) messages, or messages sent using any other suitable messaging technique. Additionally, the communication module 240 may provide application programming interface (API) functionality to send data directly to native client device operating systems, such as IOS®, ANDROID™, WEBOS® or RIM®.

Ad Request Targeting Criteria

Figure 3:
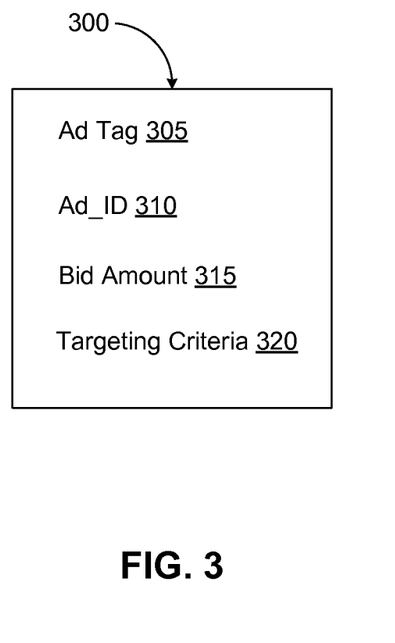
FIG. 3 is a block diagram of an ad request, according to one embodiment.

FIG. 3 is a block diagram of one embodiment of an ad request 300. In the example shown by FIG. 3, the ad request 300 includes an ad tag 305 (or link), and an ad identifier (ad ID) 310, a bid amount 315, targeting criteria 320. Ad servers 130 may generate and store ad requests 300 and select one or more stored ad requests 300 for communication to the auction server 170 based on user characteristics and targeting criteria 320 associated with ad requests 300. Alternatively, ad requests 300 may be dynamically generated by an ad server 130 when a request for bits is received.

The ad tag 305 includes a network address or other identifier specifying a source from which advertisement content associated with the ad request 300 is retrieved. For example, the ad tag 305 specifies an ad server 130 or a content delivery network 150 associated with the advertiser 140 where the ad content is stored. Hence, the ad tag 305 identifies a location where the content to be presented via the ad space 114 is retrieved. The content of the advertisement (i.e., the content presented to the user) may include any type of media content suitable for presentation on a web page, including pictures, video, audio, hyperlinks, computer program code such as JAVASCRIPT® or FLASH®, or any other suitable content. Advertisement content retrieved from an ad server 130 or from a CDN 150 may include one or more tracking mechanisms for obtaining information about the user viewing the advertisement. For example, advertisement content may include instructions that, when executed by the client device 110, insert a cookie onto the browser 112 of the user's client device 110. Information captured by the tracking mechanism may be communicated to the advertiser 140 corresponding to the advertisement to learn more about the user for future ad targeting efforts.

The ad ID 310 is information uniquely identifying the ad request 300, allowing identification of the ad request 300. The ad ID 310 may be used by the auction server 170 and the advertiser 140 to identify the ad request 300. Alternatively, the ad ID 310 is used by the advertiser 140 to identify the ad request 300 and the auction server 170 maintains a local identifier that is associated with the ad ID 310 of a received ad request 300.

The targeting criteria 320 identifies one or more characteristics of a user eligible to be presented with content associated with the ad request 300. Examples of targeting criteria 300 include an age range (e.g., 18 to 30), a gender (e.g., male or female), a geographical location (e.g., Michigan), and one or more interests (e.g., hockey, knitting) of users eligible to be presented with content corresponding to the ad request 300. Specifying targeting criteria 320 allows an advertiser 140 to identify a group of users likely to be interested in advertisement content or to identify a group of users that the advertiser 140 desires to be presented with the advertisement content.

In one embodiment, ad servers 130 monitor content browsed or accessed by users via client devices 110 to determine targeting criteria 320. For example, an advertiser 140 may base targeting criteria 320 on a user's interactions with various websites or other content, including web pages visited, keywords searched, items purchased, etc. As described above, advertisers 140 may use a variety of methods to capture user interactions with content. For example, ad servers 130 may use web bugs or tracking pixels placed on a web server's 120 website to monitor actions of users visiting the website. A tracking pixel is one or more instructions added by the advertiser 140 to content presented by a web server 120. For example, the tracking pixel is a transparent 1 pixel by 1 pixel, an iframe, or other suitable object. When a user's browser 112 requests the content from a website including the tracking pixel, the browser 112 requests content for the tracking pixel from an ad server 130 associated with the advertiser 140. The request for the tracking pixel content includes information about the client device 110 and the browser 112 presenting the tracking pixel content. For example, the request for tracking pixel content includes the Internet Protocol (IP) address of the client device 110 and the content of cookies inserted into the browser 112, allowing the ad server 130 to store the information from the request for the tracking pixel content. Other suitable methods for capturing information, such as storing cookies on the client device 110 may be used.

The bid amount 315 indicates the amount an advertiser will compensate a web server 120 for presenting advertisement content associated with the ad request 300 using ad space 114. The bid amount 315 may be specified based on a per impression (i.e., per presentation to the user) basis (or cost per impression, or CPM). Alternatively, the bid amount may be specified on a cost-per-click basis (i.e., per interaction with the advertisement) or by any other suitable basis. Bid amounts 315 may also be specified according on more general terms than at the per-ad space level.

The bid amount 315 may also be related to the targeting criteria 320 specified in the ad request 300. For example, an advertiser 140 specifies a high bid amount 315 when bidding on an ad request 300 having at least a threshold number of targeting criteria 320 matched by user characteristics and a lower bid amount 315 when bidding on an ad request 300 when bidding on an ad request 300 having less than the threshold number of targeting criteria 320 matched by user characteristics. Alternatively or additionally, bid amounts 315 may be specified in "real time," or when a request for bids is received, allowing an advertiser 140 to specify bid amounts 315 based on client devices 110 associated with different requests for bids.

In one embodiment, an advertiser 140 uses an ad server 130 as a demand-side platform (DSP) for purchasing ad space 114. For example, an advertiser 140 maintains an ad inventory on an ad server that includes content for advertisements and various ad requests 300 as well as constraints such as targeting criteria 320 and a maximum budget for various ad requests 300. Using the constraints, the ad server 130 provides bids to the auction server 170 for presenting advertisements associated with various ad requests 300. Different ad servers 130 may bid on behalf of many advertisers 140, and each advertiser 140 may use multiple ad servers 130 to purchase ad space 114.

For example, an airline advertiser may establish an advertising campaign including ad content, images, deals on flights, promotional codes, and other materials. The airline advertiser may specify targeting criteria identifying characteristics of users to be presented with ad content; for example, targeting criteria for ad content associated with flights to Europe specify an age range (e.g., 21- to 35-years old) and recent interactions (e.g., flight availability searches) associated with flights to a particular European destination. If a user has recently (e.g., in the last day) searched for flights to Vienna, a cookie on the web browser 112 inserted by the ad server 130 may capture the search. Based on the information describing the search, an ad server 130 associated with the airline advertiser may bid on an ad space 114 included in content provided to the web browser 112. The information describing the search may be used by the airline advertiser to place a high bid amount 315 for an ad request 300 associated with advertisement content for one of the airline advertiser's flights to Vienna.

Ad Proxy Server

Including user characteristics from an online system, such as the social networking system 160, in a request for bids sent to ad server 130 risks exposing information to the ad server 130 that the user of the social networking system 160 agreed to share with the social networking system 160 but with other entities. For example, if an ad request selected by the auction server 170 is associated with advertisement content including a tracking mechanism, presentation of the advertisement to a user allows the associated advertiser 140 to receive information describing user actions. Using the ad proxy server 180 to present advertisement content prevents this leakage of user information to advertisers.

Figure 4:
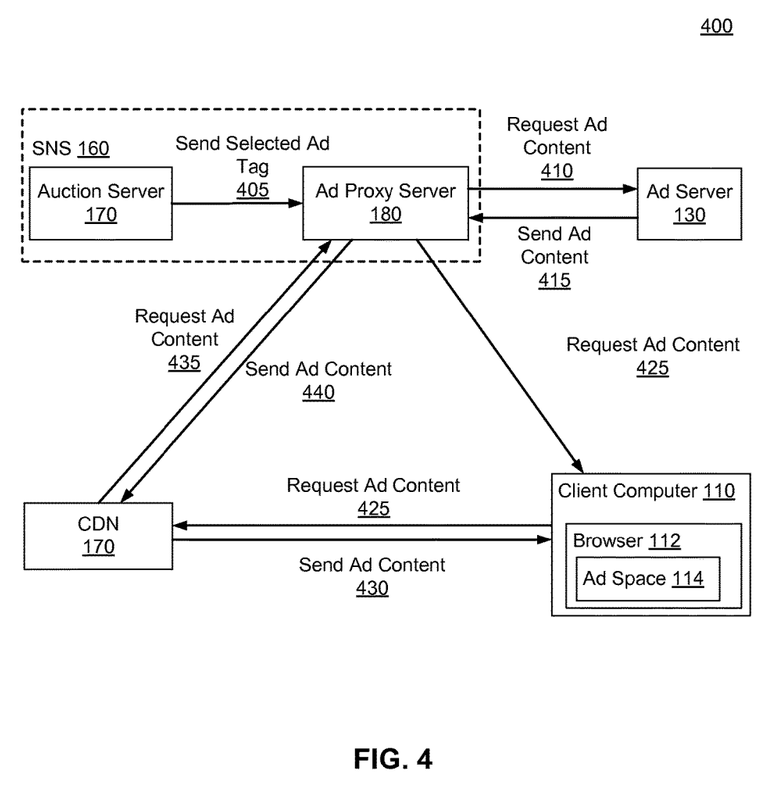
FIG. 4 is a process flow diagram illustrating providing advertisement content using an advertisement proxy server, according to one embodiment.

FIG. 4 is diagram process flow diagram of one embodiment of a method 400 for presenting advertisement content using the ad proxy server 180 in the system environment 100. The ad proxy server 180 interfaces between the ad auction server 170, ad server 130, a CDN 150, and the client device 110, isolating the client device 110 from the ad server 130. The ad proxy server 180 acts as an intermediate storage and access point between the ad server 130 and the client device 110. Advertisement content is retrieved from the ad proxy server 180 by the client device 110, rather than from an ad server 130 or a CDN associated with the advertiser 140. Thus, the ad proxy server 180 acts as a barrier between the advertiser 140 and the client device 110, preventing the advertiser 140 from correlating user characteristics with individual users, web browsers 112, and client devices 110. This reduces data leakage from the client device 110 to an advertiser 140, better protecting personal information that users have not expressly elected to share with advertisers 140. The ad proxy server 180 may serve static ad content as well as dynamic content generated on-demand by an ad server 130 for presentation.

In one embodiment, the auction server 170 sends 405 an ad tag associated with a selected ad request to the ad proxy server 180. The selected ad request may be the ad request having the highest bid price or the ad request having the highest ranking based on bid prices and targeting criteria satisfied by the user to be presented with an advertisement. Additionally, the selected ad request includes an ad tag specifying a networking address or other identifier of a location from which advertisement content is retrieved. For example, an ad tag specifies a location, such as "adserver.com/ad1234.jpg," identifying an ad server 130 and content maintained by the ad server 130. Hence, the ad tag specifies a location from which a web browser 112 retrieves ad content for presentation to a user is associated with an advertiser 140 and includes.

The ad proxy server 180 requests 410 the ad content from the network location specified by the selected ad tag. For example, the ad proxy server 180 requests 410 the ad content from an ad server 130, which sends 415 the ad content to the ad proxy server 180. Alternatively, the ad tag identifies a content delivery network (CDN) 150 associated with the advertiser, and the ad proxy server 180 requests 410 the ad content from the CDN 150, which sends 415 the ad content to the ad proxy server 180. If the CDN 150 does not have a locally stored copy of the ad content, it retrieves the ad content from the ad server 130 and sends 415 the ad content to the ad proxy server 180.

A copy of the received ad content is stored by the ad proxy server 180 or by a CDN 150 associated with the ad proxy server 180. The ad proxy server 180 may remove instructions for implementing a tracking mechanism from the ad content when storing the copy of the ad content. This provides additional protection to users by disabling or removing tracking methods provided by an advertiser 140.

Additionally, the ad proxy server 180 generates a modified ad tag uniquely associated with the received ad tag 305. The modified ad tag also specifies a network address or other identifier of a location from which ad content is retrieved by a client device 110. However, the modified ad tag identifies a location associated with the ad proxy server 180, such as a CDN 150 associated with the ad proxy server 180, or the ad proxy server 180. Hence, the modified ad tag does not identify a location associated with an advertiser 140. The modified ad tag may be a modified version of the ad tag 305 itself. Alternatively, the modified ad tag may be unrelated to the received ad tag and associated with the received ad tag based on a matching table maintained by the ad proxy server 140. For example, for an ad tag of "adserver.com/ad1234.jpg," modified ad tags of "adproxyserver.net/ad1234.jpg" or "adproxyserver.CDN.net/ad1234.jpg" may be generated. These example network addresses point to the ad proxy server 180 and a CDN 150 associated with the ad proxy server 180, respectively. The ad proxy server 180 may asynchronously generate the modified ad tag and request 410 ad content from the location specified by the received ad tag.

The ad proxy server 180 sends 420 the modified ad tag to the client device 110, which requests 425 ad content from the location specified by the modified ad tag. In the example shown by FIG. 4, the modified ad tag includes a network address of a CDN 150 associated with the ad proxy server 140, so the client device 110 requests 425 ad content from the CDN 150. However, the modified ad tag may specify a network address of the ad proxy server 180, so the client device 110 requests 415 ad content from the ad proxy server 180. In the example of FIG. 4, the CDN 150 associated with the ad proxy server 180 sends 430 the ad content from the sorted copy of the ad content to the client device 110 for display. Alternatively, the ad proxy server 180 sends 420 the ad content to the client device 110 for display.

In one embodiment, if the modified ad tag identifies the CDN 150 associated with the ad proxy server 180 and the CDN 150 does not include a copy of the ad content, the CDN 150 requests 435 ad content from the ad proxy server 180, which sends 440 ad content from the copy of the ad content to the CDN 150. The CDN 150 uses the location specified by the modified ad tag to identify the ad proxy server 180 from which the ad content is retrieved. In one embodiment, the CDN may modify the modified ad tag to identify network address or location of the ad proxy server 180 from the modified ad tag based on instructions included in the modified ad tag or determined by the CDN 150 and the ad proxy server 180.

Alternatively, the modified ad tag comprises two network addresses or identifiers. A first network address specifies the entity from which the client device 110 requests 425 ad content, such as an identifier of the CDN 150 associated with the ad proxy server 180. A second network address specifies the entity from which the CDN retrieves a copy of the ad content, such as the ad proxy server 180.

If the ad proxy server 180 does not receive the ad content from the ad sever 130 before the CDN 150 associated with the ad proxy server 180 or the ad proxy server 180 receives a request 425 from a client device 110 for the ad content, an error message may be provided to the client device. In another embodiment, when this occurs the CDN 150 or client device 110 may wait up to a specified time limit for a response including the copy of the ad content. This allows the ad proxy server 180 time to receive the ad content form the ad server 130.

Ad Proxy Server Operation

Figure 5:
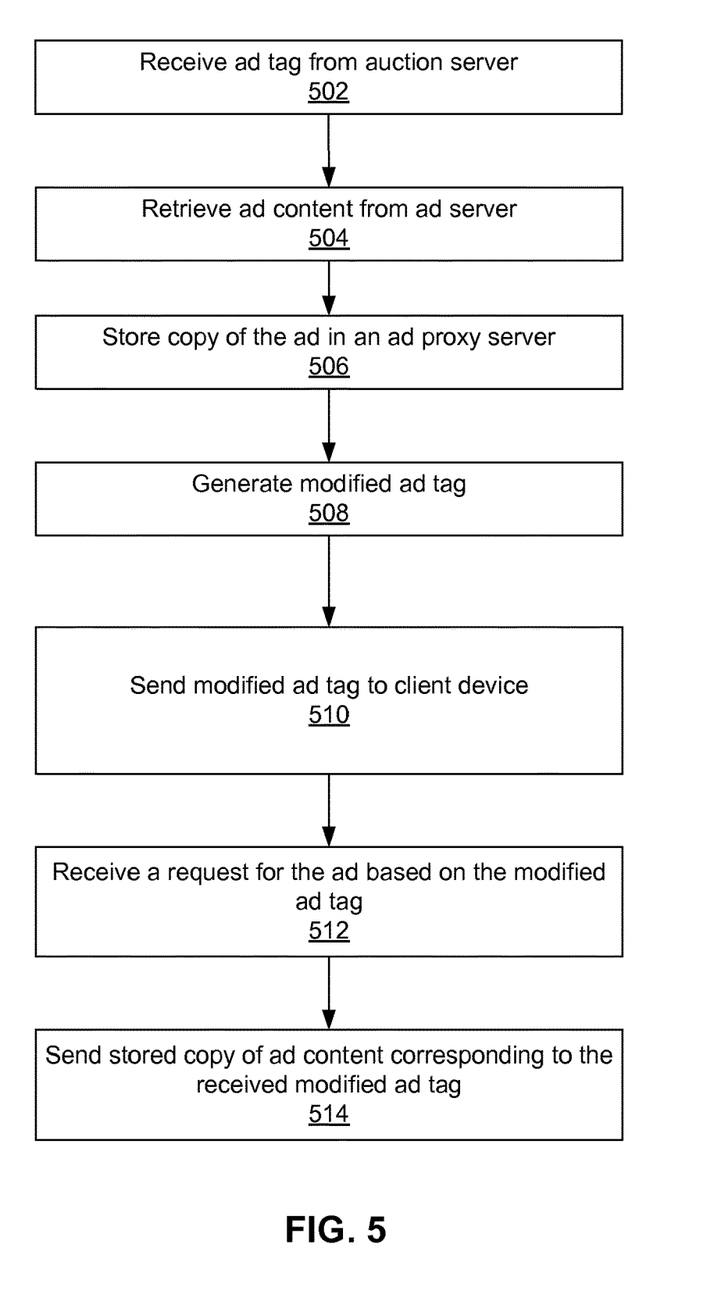
FIG. 5 is a flowchart of a method for providing advertisement content using an advertisement proxy server, according to one embodiment.

FIG. 5 is a flowchart of one embodiment of a method for presenting advertisement content via an ad proxy server 180. The ad proxy server 180 receives 502 an ad tag associated with a selected ad request. Using the location identified by the received ad tag, the ad proxy server 180 requests 504 ad content associated with the selected ad request and locally stores 506 a copy of the ad content. From the ad tag, the ad proxy server 180 generates 508 a modified ad tag. As described above, the modified ad tag identifies a location where the copy of the ad content is stored that is not associated with the advertiser 140 associated with the selected ad request. For example, the modified ad tag identifies a location associated with the ad proxy server 180 rather than associated with an ad server 130 or with an advertiser 140.

The modified ad tag is sent 510 to a client device 110 on which an advertisement it to be presented. In one embodiment, the modified ad tag is sent 510 to the client device asynchronously with requesting 504 ad content associated with the selected ad request from an ad server 130 or another source. Using the modified ad tag, the client device 110 requests the copy of the ad content from the location not associated with the advertiser 140. For example, the ad proxy server 180 stores the copy of the ad content and receives 512 a request for the ad from the client device 110. Responsive to the request, the ad proxy server 180 sends 514 the copy of the ad content associated with the modified ad tag to the client device 110 for presentation.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
receiving, at an online system, an ad request to present an advertisement to a client computing device;
accessing, by the online system, a plurality of bid requests from a plurality of different advertisers, each bid request associated with a targeting criteria and an ad tag, the ad tags comprising one or more network addresses identifying one or more locations on one or more computer servers where advertisement content for the advertisement can be obtained;
determining, by the online system, a set of eligible bid requests from the plurality of bid requests by identifying bid requests having targeting criteria matched by one or more characteristics of a user associated with the client computing device;
selecting, by the online system, one of the bid requests from the set of eligible bid requests, the selected bid request associated with a selected ad tag, the selected ad tag identifying an advertiser network address associated with one of the advertisers;
retrieving, by the online system, the advertisement content associated with the selected ad tag from the advertiser network address;

storing, by the online system, a copy of the advertisement content at a proxy network address associated with the ad proxy server wherein storing the copy comprises removing a tracking pixel included in the copy of the advertisement content, the tracking pixel is configured to track web browsing activity associated with the client computing device;

generating, by the online system, a modified ad tag associated with the selected ad tag;

replacing, by the online system, the advertiser network address associated with the selected ad tag with the proxy network address;

responsive to the ad request, sending, from the online system, the modified ad tag to the client computing device;

receiving, at the proxy network address from the client computing device, a content request to obtain the advertisement content; and responsive to the content request, sending the copy of the advertisement content to the client computing device.

2. The method of claim 1, wherein replacing the advertiser network address with the proxy network address comprises: appending a network address associated with the ad proxy server to a network address included in the ad tag.

3. The method of claim 1, wherein the modified ad tag includes a portion of the selected ad tag.

4. The method of claim 1, wherein a proxy network address specifies a content delivery network not associated with the advertiser.

5. The method of claim 1, wherein the online system is also a social networking computer server.

6. A method comprising:

receiving, at an online system, an ad request to present an advertisement to a client computing device;

accessing, by the online system, a plurality of bid requests from a plurality of different advertisers, each bid request associated with a targeting criteria and an ad tag, the ad tags comprising one or more network addresses identifying one or more locations on one or more computer servers where advertisement content for the advertisement can be obtained;

determining, by the online system, a set of eligible bid requests from the plurality of bid requests by identifying bid requests having targeting criteria matched by one or more characteristics of a user associated with the client computing device;

selecting, by the online system, one of the bid requests from the set of eligible bid requests, the selected bid request associated with a selected ad tag, the selected ad tag identifying an advertiser network address associated with one of the advertisers;

retrieving, by the online system, the advertisement content associated with the selected ad tag from the advertiser network address;

sending, from the online system, a copy of the advertisement content to be stored at a proxy network address associated with the ad proxy server, wherein storing the copy comprises removing a tracking pixel included in the copy of the advertisement content, the tracking pixel is configured to track web browsing activity associated with the client computing device;

generating, by the online system, a modified ad tag based on the selected ad tag, the modified ad tag replacing the advertiser network address with the proxy network address; and responsive to the ad request, sending, from the online system, the modified ad tag to the client computing device wherein the modified ad tag is configured to cause the client computing device to obtain the copy of the advertisement content from the proxy network address.

7. The method of claim 6, wherein replacing the advertiser network address with the proxy network address comprises: appending a network address associated with the ad proxy server to a network address included in the ad tag.

8. The method of claim 6, wherein the modified ad tag includes a portion of the selected ad tag.

9. The method of claim 6, wherein a proxy network address specifies a content delivery network not associated with the advertiser.

10. The method of claim 6, wherein the online system is also a social networking computer server.

11. The method of claim 1, wherein the modified ad tag does not identify a location associated with the advertiser.

12. The method of claim 6, wherein the modified ad tag does not identify a location associated with the advertiser.

* * * * *